UNITED STATES PATENT OFFICE.

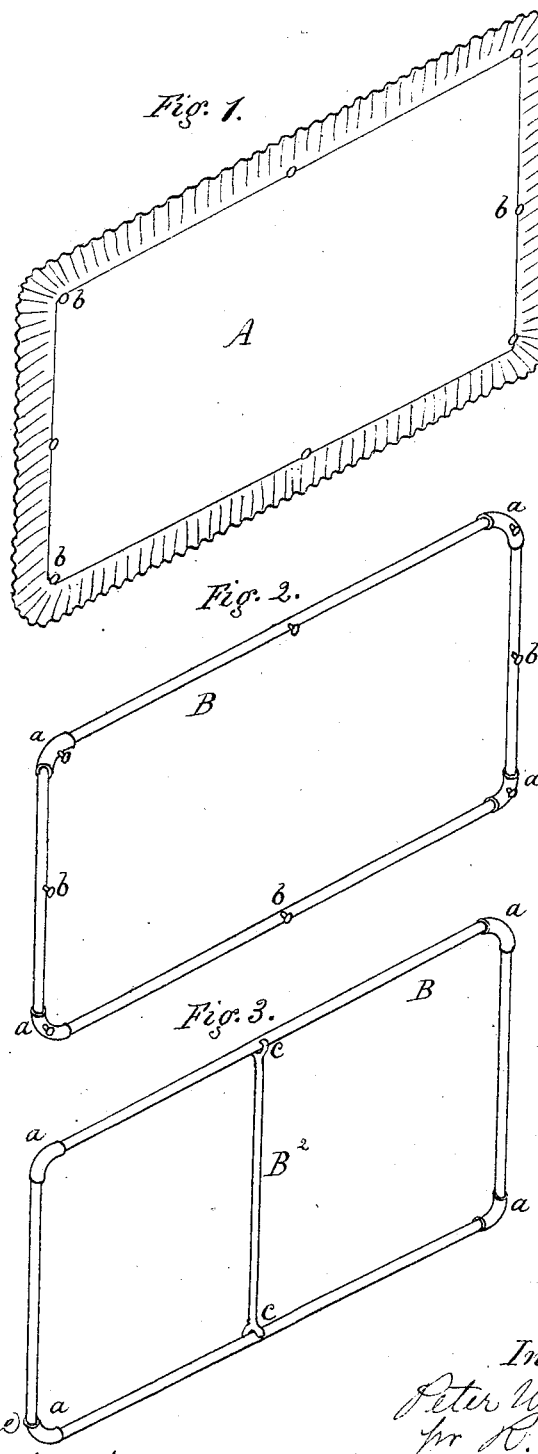

PETER W. VAN EST, OF ROCHESTER, NEW YORK.

IMPROVEMENT IN FRAMES FOR PILLOW-SPREADS.

Specification forming part of Letters Patent No. 135,389, dated January 28, 1873.

*To all whom it may concern:*

Be it known that I, PETER W. VAN EST, of the city of Rochester, in the county of Monroe and State of New York, have invented a certain new and useful Improvement in Frames for Pillow Spreads or Covers; and I do hereby declare that the following is a full, clear, and exact description of the same.

My invention consists of a frame for holding the pillow-spread, constructed and arranged as hereinafter described.

In the drawing, Figure 1 is a perspective view of the pillow-spread attached to the frame; Fig. 2, a similar view of the frame with the spread removed from place; Fig. 3, a view similar to Fig. 2, but showing a modification.

A represents the spread, and B the frame. The former does not differ from that in ordinary use. The frame is made of wire, rattan, or any other suitable material, and bent of rectangular, square, or such other form as may correspond with the spread which it holds. I contemplate using, as the most suitable material, galvanized wire, as it will not rust nor corrode nor soil the cloth which comes in contact with it. If desired, the frame may be covered by a winding of cloth or other material. The wire, being cut of suitable length, is bent into proper form, and the ends soldered or otherwise connected. Previous to soldering, I string upon the wire pads $a\ a$, formed of sections of rubber tubing or other soft or flexible material, which come at the corners, as shown, and at intermediate points, if desired—the object of which is to prevent marring or scratching of the bedstead. To the frame, at suitable points, are attached buttons $b\ b$, over which pass button-holes formed in the spread, and which serve to attach the spread to the frame. Instead of buttons, hooks and eyes, or any equivalent attachment, may be employed.

The frame, as above described, will usually be sufficient to hold the spread; but, if desired, a cross-rod, $B^2$, may be used, extending across the center of the frame and having open or forked heads $c\ c$, which catch and hold upon the sides of the frame when the latter are sprung open. This cross-rod gives a central support to the spread and prevents any undue depression or bagging.

I claim as my invention—

The frame B, provided with the pads $a\ a$ and buttons $b\ b$, or equivalents, and used either with or without the cross-rod $B^2$, constructed substantially in the manner and for the purpose specified.

In witness whereof I have hereunto set my hand this 12th day of November, 1872.

PETER W. VAN EST.

Witnesses:
 R. F. OSGOOD,
 ARCHIE BAINE.